(12) United States Patent
Entenmann et al.

(10) Patent No.: US 12,739,519 B2
(45) Date of Patent: Sep. 15, 2026

(54) CAMERA SYSTEM AND METHOD FOR THE OPERATION THEREOF

(71) Applicant: MERCEDES-BENZ GROUP AG, Stuttgart (DE)

(72) Inventors: Volker Entenmann, Affalterbach (DE); Sven Fleck, Sindelfingen (DE); Thomas Albert Föhn, Lichtenstein (DE); Stefan Kalchmair, Aidlingen (DE); Benjamin May, Lübs (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/996,177

(22) PCT Filed: Jul. 7, 2023

(86) PCT No.: PCT/EP2023/068894
§ 371 (c)(1),
(2) Date: Jan. 17, 2025

(87) PCT Pub. No.: WO2024/017675
PCT Pub. Date: Jan. 25, 2024

(65) Prior Publication Data

US 2026/0039966 A1 Feb. 5, 2026

(30) Foreign Application Priority Data

Jul. 19, 2022 (DE) ..................... 10 2022 002 637.6

(51) Int. Cl.
*H04N 23/741* (2023.01)
*H04N 23/11* (2023.01)
(Continued)

(52) U.S. Cl.
CPC ........... *H04N 23/741* (2023.01); *H04N 23/11* (2023.01); *H04N 23/56* (2023.01); *H04N 23/61* (2023.01);
(Continued)

(58) Field of Classification Search
CPC ...... H04N 23/741; H04N 23/11; H04N 23/56; H04N 23/61; H04N 23/64; H04N 23/72; H04N 23/73; H04N 23/74
(Continued)

(56) References Cited

U.S. PATENT DOCUMENTS 7,609,291 B2 * 10/2009 Oon ....................... G03B 15/03 348/162
9,615,013 B2 * 4/2017 Lewkow ............. H04N 25/772
(Continued)

FOREIGN PATENT DOCUMENTS

DE 102018112345 A1 11/2018
EP 2448251 A2 5/2012
(Continued)

OTHER PUBLICATIONS

Office Action dated Sep. 16, 2025 in related/corresponding JP Application No. 2024-576838.
(Continued)

*Primary Examiner* — Tung T Vo
(74) *Attorney, Agent, or Firm* — PATENT PORTFOLIO BUILDERS PLLC

(57) ABSTRACT

A camera module is controlled in order to expose the image sensor with a first exposure duration during at least one first recording process to generate a first RGB image. The An infrared light source is controlled to additionally illuminate the scene with infrared light during at least one second recording process and simultaneously the camera module exposes an image sensor during the second recording pro-
(Continued)

Figure 1:
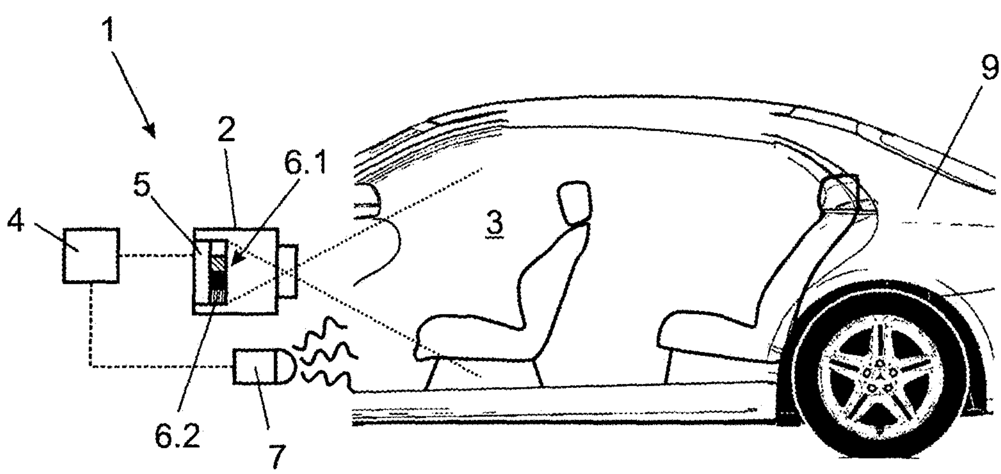

cess with a second exposure duration deviating from the first exposure duration to generate a second RGB image and an IR image. The at least one first RGB image and the at least one second RGB image are merged to form an HDR image.

20 Claims, 5 Drawing Sheets

(51) Int. Cl.
*H04N 23/56* (2023.01)
*H04N 23/60* (2023.01)
*H04N 23/61* (2023.01)
*H04N 23/72* (2023.01)
*H04N 23/73* (2023.01)
*H04N 23/74* (2023.01)

(52) U.S. Cl.
CPC ............. *H04N 23/64* (2023.01); *H04N 23/72* (2023.01); *H04N 23/73* (2023.01); *H04N 23/74* (2023.01)

(58) Field of Classification Search
USPC .......................................................... 348/164
See application file for complete search history.

(56) References Cited

U.S. PATENT DOCUMENTS

2012/0224019 A1* 9/2012 Samadani .............. H04N 5/325 348/14.01
2015/0002629 A1* 1/2015 Wei ...................... H04N 13/207 348/46
2016/0182791 A1* 6/2016 Lewkow .............. H04N 7/0127 348/262
2017/0142312 A1* 5/2017 Dal Mutto ........... H04N 13/106
2019/0305018 A1* 10/2019 Price ..................... H10F 39/182
2020/0322580 A1 10/2020 Pu et al.
2020/0336677 A1* 10/2020 Numata ................. H04N 23/60
2021/0195087 A1* 6/2021 Peng ....................... G06T 7/001
2022/0046194 A1* 2/2022 Zhang .................. H04N 25/531
2022/0070432 A1 3/2022 Zhang et al.
2022/0392182 A1 12/2022 Tu et al.
2023/0262343 A1* 8/2023 Choi ......................... G06T 7/20 382/274
2023/0336875 A1* 10/2023 Pieper ...................... G02B 5/20
2024/0179382 A1* 5/2024 Nayak .................... H04N 23/11
2024/0214709 A1* 6/2024 Berkovich ............. H04N 25/78
2024/0273675 A1* 8/2024 Huang ................. H04N 23/741
2024/0289925 A1* 8/2024 Saheli ....................... G06T 5/50
2025/0211701 A1* 6/2025 Han ......................... H04N 1/60

FOREIGN PATENT DOCUMENTS

EP 3468178 A1 4/2019
WO 2021160001 A1 8/2021

OTHER PUBLICATIONS

International Search Report and Written Opinion mailed Nov. 20, 2023 in related/corresponding International Application No. PCT/EP2023/068894.
Office Action created Dec. 23, 2022 in related/corresponding DE Application No. 10 2022 002 637.6.
Office Action dated Oct. 30, 2025 in related/corresponding KR Application No. 10-2024-7040156.

* cited by examiner

CAMERA SYSTEM AND METHOD FOR THE OPERATION THEREOF

BACKGROUND AND SUMMARY OF THE INVENTION

Exemplary embodiments of the invention relate to a camera system and a method for the operation thereof.

Camera systems, both in analog and in digital implementation, are sufficiently known. To generate digital camera images, corresponding camera systems typically use image sensors, such as a CMOS sensor. Such an image sensor comprises a plurality of pixels arranged in a two-dimensional grid, which emit an electronic signal in the event of exposure to light. To generate colored camera images, color filters are placed in front of the pixels, for example in red, green and blue. The filters are additionally arranged in a regular pattern. The filters can be, for example, Bayer filters or interference filters. By providing suitable components, individual pixels can also be made sensitive to infrared light. This makes it possible for an image sensor to capture both colored images on the visible spectrum and also images on the infrared spectrum.

If this is desired, then exposure series are typically generated from a sequence of color images and infrared images. In a camera system with an image capture rate (frame rate) of 60 images per second, color images and infrared images can respectively be captured at a capture rate of 30 images per second when a color image and then an infrared image are captured alternately.

To increase the dynamic scope, exposures with different exposure durations can also be recorded in an exposure series, which enables the generation of high dynamic range images, better known as high dynamic range (HDR). In a camera with a sampling rate of 60 images per second and three consecutive exposures with a short, medium, and long exposure duration, it is then possible, for example, to generate an HDR video with a frequency of 20 images per second.

The simultaneous generation of infrared images and HDR images leads to a reduction in the image repetition rate of the corresponding HDR video stream and infrared video stream generated by the camera system, since the camera has to record color images with different exposure durations and additionally infrared images one after the other. If the image repetition rate of a video stream is too low, for example less than 30 images per second, then the corresponding video is perceived as “jerky” or “choppy”, which makes viewing less comfortable for the user. Too long an exposure duration or too large a time difference between the individual images of an exposure series is additionally associated with the occurrence of motion artifacts. If a person moves during the recording of a corresponding exposure series, then this appears “smeared” in the video stream.

Camera systems are also used in vehicles in order to provide comfort and safety functionalities. For example, an interior camera can thus be used to monitor driver status or detect seat occupancy. The camera system can also be used by the vehicle occupants to take “selfies” or make video calls. In particular for the provision of safety-relevant functions such as monitoring driver status, infrared images are recorded, which ensures sufficient image quality even in poor lighting conditions, for example in the dark. Here, an active illumination of the vehicle interior can take place with an infrared light source when a corresponding infrared image is recorded. The camera system and the infrared light source are synchronized for this purpose.

To reduce costs and to use the available installation space in the vehicle as efficiently as possible, as few cameras as possible should be used, ideally a single camera. At the same time, it is here necessary to record camera images or videos with the highest possible dynamic scope, high image quality, and high image repetition rate in both the visible and infrared spectrum.

To increase the image repetition rate when generating HDR videos, a corresponding vehicle camera system is known from DE 10 2018 112 345 A1. The vehicle camera system comprises a ring buffer into which the camera images generated using the camera system are fed. The ring buffer has a certain size, such that camera images generated in the past are overwritten by currently generated camera images. An HDR image is here generated from an exposure group. Such an exposure group comprises, for example, three individual exposures, each with a different exposure duration, for example a short, medium, and long exposure duration. The vehicle camera system disclosed in the printed publication makes it possible to generate an HDR image after each capture of an individual exposure instead of having to capture a complete exposure group first. In this way, the currently captured single exposure overwrites the single exposure of the exposure group used to generate the HDR image with the same exposure duration. With three different exposure durations, each individual exposure is thus used to generate three HDR images.

Exemplary embodiments of the present invention are directed to an improved camera system and a method for the operation thereof, by means of which camera images or videos on the visible spectrum and on the infrared spectrum can be captured simultaneously and here a high image repetition rate can be obtained for both the color images and the infrared images despite providing a comparatively high dynamic scope in the color images.

A camera system of the type mentioned at the beginning has a camera module for generating camera images of a scene and a computing unit for controlling the camera module and for processing the camera images, wherein the camera module has an image sensor that is set up to detect light in the visible spectrum by means of RGB exposure means and light in the infrared spectrum by means of IR exposure means, the camera module is set up to capture at least two individual images of the scene by exposing the image sensor during at least two recording processes with different exposure durations, and the computing unit is set up to merge at least two individual images to form an HDR image. According to the invention, the camera system is further formed by the provision of an infrared light source, wherein the computing unit is further set up according to the invention to:

- control the camera module in order to expose the image sensor with a first exposure duration during at least one first recording process, wherein a first RGB image is generated by means of the RGB exposure means;
- control the infrared light source in order to additionally illuminate the scene with infrared light during at least one second recording process, and simultaneously control the camera module in order to expose the image sensor during the second recording process with a second exposure duration deviating from the first exposure duration, wherein a second RGB image is generated by means of the RGB exposure means and an IR image is generated by means of the IR exposure means; and
- merge the at least one first RGB image and the at least one second RGB image to form an HDR image.

The camera system according to the invention makes it possible to capture both RGB images, i.e., color images (the letters stand for red, green and blue, for example), and IR images, i.e., images captured in the infrared spectrum, at a comparatively high image recording rate and here to ensure a high dynamic scope in the color images. The core idea here is the simultaneous generation of an RGB image and an IR image during the second recording process. So that an HDR image, i.e., a high dynamic range image, can be generated from the first RGB image and the second RGB image, the respective exposure durations must here be different. In general, it does not matter here whether the first exposure duration is longer or shorter in comparison to the second exposure duration. However, the second exposure duration is preferably shorter than the first exposure duration, since a comparatively short exposure duration is used to generate the IR image while simultaneously illuminating the scene by means of the infrared light source. Typically, the second exposure duration can be in the order of 100 μs to 1 ms.

If, for example, people are to be recorded by means of the camera system according to the invention, in particular the direction of a person's gaze is to be tracked, the infrared illumination of the person must thus be limited to a set maximum duration for each illumination in order to ensure the safety of the person's eyes. If the infrared illumination is too long, illuminated surfaces can also heat up. This must be avoided. Exposure durations that are too long also have a detrimental effect on the service life of the image sensor or the infrared light source. The exposure duration must here be sufficiently long in order to prevent underexposure of the exposure means, i.e., for example the corresponding pixels of a CMOS sensor, but must also not be too long in order to prevent overexposure of the pixels. If the exposure duration is too short, so-called image noise also increases.

The camera module and the computing unit can be integrated into a common device or can also be arranged to be distributed locally. A single image is generated during a recording process. The recording process can thus also be referred to as an exposure. A corresponding exposure series can then also be referred to as a recording group. The infrared light source can be arranged anywhere opposite the camera module and the computing unit and can have any number of infrared light sources. The camera system according to the invention can, for example, be integrated into a vehicle. In this case, the camera module can be arranged in the instrument panel of the vehicle, for example in the region of the instrument cluster or the head unit, and orientated in the direction of the vehicle interior. The infrared light source can be arranged to the side next to the camera module. With a camera system integrated into a vehicle, the computing unit can also be formed by a control unit of a vehicle subsystem.

An advantageous development of the camera system provides that the camera module and the computing unit are further set up to continuously record the scene with a sequence of a plurality of at least first and second recording processes, wherein at least several first RGB images and second RGB images captured temporally in succession are combined to form an RGB video stream, several IR images captured temporally in succession are combined to form an IR video stream, and/or several HDR images generated temporally in succession are combined to form an HDR video stream. The camera system according to the invention thus allows the generation of video streams, i.e., videos with comparatively high image repetition rates. For example, if the camera system has a scanning rate of 60 images per second, then an RGB video stream, i.e., a color video with an image repetition rate of 60 images per second, an IR video stream with an image repetition rate of 30 images per second, and an HDR video stream with 30 images per second can be generated. This means that color videos can be generated with the same image repetition rate as the image recording rate of the camera module and IR videos and HDR videos can be generated with an image repetition rate corresponding to half the scanning rate of the camera module.

The corresponding video streams can be used in the vehicle to provide a wide range of functionalities. For example, the camera images and/or videos can be processed by a computing device and read in directly or information obtained from them as an input variable by a driver assistance system. For example, the IR video stream can be used to track the gaze direction of the person driving the vehicle and/or to carry out fatigue recognition based on an eyelid frequency.

The camera system according to the invention correspondingly carries out the process steps of generating and extracting the RGB video streams, IR video streams, and/or HDR video streams. For this purpose, the camera system continuously captures the scene with the sequence of the respective capture processes.

Corresponding to a further advantageous design of the camera system, the computing unit is furthermore set up to:

- control the camera module in order to expose the image sensor with a third exposure duration deviating from the first and second during at least one third recording process, wherein a third RGB image is generated by means of the RGB exposure means;
- set the sequence of the recording processes to: first recording process, second recording process and third recording process; and
- merge the at least one first RGB image, the at least one second RGB image and the at least one third RGB image to form an HDR image.

The camera system according to the invention thus also allows more than two different exposures to be taken into consideration when generating an HDR image. The third exposure duration differs from the first and second exposure durations and is in particular greater than the second exposure duration. Here, the third exposure duration can be greater or less than the first exposure duration.

The camera system is thus able to implement the method step of carrying out a third recording process with a third exposure duration and correspondingly generating a third RGB image and additionally taking this into consideration for merging the HDR image. In doing so, the dynamic scope of the HDR image can be further increased.

The more individual images with different exposure durations generated and corresponding video streams output, the more greatly the image repetition rate of the corresponding video streams decreases. For example, if the camera system has a scanning rate of 60 images per second, then the image repetition rate for the IR video stream and for the HDR video stream will respectively be 20 images per second when the first, second, and third recording processes are carried out. In general, it would here be conceivable to provide yet further recording processes, i.e., for example a third, fourth, or fifth recording process, or even more recording processes, each with an individual exposure duration. Correspondingly, the dynamic scope of the HDR images can be improved at the expense of the image repetition rate.

To generate an HDR image, a recording group is used from the first, second, and third recording. The camera system thus generates a sequence from the first, second, and third recording before the first, second, and third recording process is carried out again. Depending on where the sequence of the recording processes is viewed, this also corresponds to a sequence of the recording processes: second recording process, third recording process and first recording process or third recording process, first recording process and second recording process. The respective recording processes can thus be rearranged as required; the only relevant factor is that each of the three different recording processes is carried out exactly once before a respective recording process is carried out again, i.e. a single image is captured again with the respective exposure duration.

A further advantageous design of the camera system according to the invention moreover provides that the computing unit is furthermore set up to:

- control the camera module in order to expose the image sensor with a third exposure duration deviating from the first and second during at least one third recording process, wherein a third RGB image is generated by means of the RGB exposure means;
- set the sequence of the recording processes to: second recording process, first recording process, second recording process, and third recording process; and
- merge the at least one first RGB image with at least one second RGB image, and the at least one third RGB image with at least one second RGB image, or the at least one first RGB image, the at least one second RGB image and the at least one third RGB image to form an HDR image.

In contrast to the previous design, a recording process in which only an RGB image is generated and a recording process in which both an RGB image and an IR image are generated are now carried out alternately. This allows corresponding video streams to be output with an increased image repetition rate despite the third recording process being provided with the third exposure duration. At a scanning frequency of 60 hertz, an image repetition rate of 30 images per second can be respectively guaranteed for the IR video stream and for the HDR video stream. This is possible by a second recording process being respectively inserted between the first and third recording process or between the third and first recording process and by two different exposures being used to generate HDR images, i.e., a combination of the first recording process and second recording process and a third recording process and second recording process. It would also be possible to use all three capture processes to generate the HDR images. This would reduce the frame rate for a corresponding HDR video stream to 20 frames per second. Furthermore, one of the two second capture processes is then omitted for the generation of the HDR image.

Within a recording group for generating an HDR image, each recording process in which only an RGB image is generated thus occurs exactly once, wherein these recording processes are each separated from one another by a recording process in which both an RGB image and an IR image are generated in each case.

If yet more recording processes are correspondingly carried out, for example even a fourth, fifth, or sixth recording process, in which exclusively one RGB image with an individual exposure duration is captured, then a second recording process is respectively inserted between these recording processes.

To do so, the camera system according to the invention implements corresponding method steps.

According to a further advantageous design of the camera system according to the invention, the computing unit comprises a ring buffer, which is set up to sequentially buffer individual images generated temporally one after the other, such that by adding a respective most recent individual image to the ring buffer, the respective oldest individual image is deleted from the ring buffer, and which has at least such a buffer capacity that at least one first RGB image, a second RGB image, and an IR image can be permanently held in the ring buffer; and wherein the computing unit is further set up to merge at least the respectively most recent first RGB image and second RGB image to form the HDR image in order to generate the HDR image. This makes it possible to generate an HDR video stream with the same image repetition rate as the scanning rate of the camera module.

The camera system then implements method steps corresponding to this.

This means that it is no longer necessary to capture a complete recording group consisting of at least the first RGB image and the second RGB image to generate an HDR image. This means that an HDR image can already be generated after each capture of an RGB image, thus for example after capturing the first RGB image as well as after capturing the second RGB image.

Here, according to an advantageous development of the camera system according to the invention, the computing unit can further be set up to set the sequence of the recording processes to:

first recording process;
second recording process; and
to merge second recording process, and the respectively most current first RGB image, second RGB image and third RGB image to form the HDR image.

This allows the dynamic range of the HDR image to be increased compared to using the first and second recording processes alone. Thanks to the use of the ring buffer, an image repetition rate corresponding to the scanning rate of the camera module can also here be guaranteed.

To do so, the camera system implements the following method steps: carrying out the first recording process, third recording process, and then the second recording process, and then merging the RGB images respectively generated to form the HDR image by the computing unit, wherein the respectively most recent images are read out of the ring buffer.

Corresponding to a further advantageous design of the camera system according to the invention, the computing unit can further be set up to set the sequence of the recording processes to:

second recording process;
first recording process;
second recording process; and
third recording process, and to merge the respectively most current first RGB image, second RGB image and third RGB image to form the HDR image.

This makes it possible to increase the image repetition rate of the IR video stream at the expense of the image repetition rate of the HDR video stream. While in the sequence "first recording process, third recording process, and second recording process", the image repetition rate of the IR video stream corresponds to a third of the scanning rate of the camera module, and the image repetition rate of the HDR video stream corresponds to the scanning rate of the camera module, the sequence "second recording process, first recording process, second recording process, and third recording process" then allows an image repetition rate of the IR video stream corresponding to half the scanning rate of the camera module, which applies analogously to the image repetition rate of the HDR video stream.

Correspondingly, the camera system implements the following method steps: carrying out the respective recording processes in which only one RGB image is captured, each separated by carrying out a second recording process and subsequent merging of the respective RGB images to form the HDR image by the computing unit, wherein the respectively most recent images are read out from the ring buffer.

A further advantageous design of the camera system according to the invention additionally provides that the computing unit is furthermore set up to determine the speed of movement of an object present in at least two successive individual images, to compare this with a predetermined threshold value and to exclude the RGB images generated for the corresponding recording processes from merging into an HDR image when the speed of movement is greater than the threshold value. To determine the speed of movement, the computing unit can evaluate a change in the position of the respective object in the two individual images. However, the camera system can also comprise other sensors such as a radar system, a laser scanner, or similar, which can be used to generate depth information. This makes it possible to ascertain the speed of movement of the object, in particular taking into consideration the time-of-flight principle, by means of a time-dependent change in position of the object. If the corresponding object, for example a vehicle occupant, moves "too quickly", then the respective object appears as "washed out" in the HDR image generated from the corresponding RGB images. However, by excluding the corresponding RGB images from merging into an HDR image, it is possible to prevent HDR images being generated in which objects appear blurred or smeared. In addition to smearing, it is also possible for an object that is moving too quickly to be distorted. To remedy this, proven homography methods and/or deghosting can be used from the prior art.

Correspondingly, the camera system carries out a method step in which the camera system determines the speed of movement of the object in at least two successive individual images, compares these with the predetermined threshold value and, if the speed of movement exceeds the threshold value, excludes these RGB images from merging to form the HDR image.

A further advantageous design of the camera system according to the invention provides that the computing unit is furthermore set up to recognize at least one edge of an object present in at least two successive individual images and/or a surface structure of the object, to compare the edge and/or the surface structure in the respective individual images with one another to recognize a difference and to exclude the RGB images generated for corresponding recording processes from merging to form an HDR image when the recognized difference is greater than a predetermined threshold value.

To do so, a corresponding method step is carried out by the camera system.

It can happen that materials detected by the camera system have a different reflectivity in the visible spectrum and in the infrared spectrum. This can lead, for example, to an upper layer of clothing of a vehicle occupant appearing transparent in the infrared spectrum or the pattern of a checked shirt not being recognizable in the infrared spectrum. Such RGB images can be excluded from merging into an HDR image.

A further advantageous design of the camera system according to the invention further provides that the computing unit is furthermore set up to implement a machine learning model into which the at least two individual images can be read as an input variable when the difference is greater than the threshold value, whereupon the machine learning model generates a correction image from the at least two individual images, in which correction image the edge and/or surface structure is highlighted and/or positioned differently in order to reduce the difference below the threshold value.

To do so, the camera system implements a corresponding method step.

In particular, the machine learning model can be an artificial neural network or use one of these. Thanks to sufficient training, the machine learning model can recognize surface structures, clothing, patterns, parts of the face, eyes, teeth, and similar in the corresponding individual images and respectively correlate them in relation to one another in the two individual images. If the corresponding surface structure and/or edge is then missing in one of the individual images, then the machine learning model retrospectively inserts it in the corresponding individual image or positions it differently.

Preferably, the at least two consecutive individual images are at least one RGB image and at least one IR image. For example, the pattern of a checked shirt can thus be recognized in an RGB image and transferred to a corresponding IR image for display. Analogously, transparent layers of clothing can be made opaque, for example, or edges that are not recognizable in an RGB image due to darkness, for example, can be transferred from the IR image to the corresponding RGB image that is too dark and highlighted there.

Preferably, the computing unit is furthermore set up to control the camera module and the infrared light source in order to change the second exposure duration, a time duration with which the infrared light source is operated and/or a sensitivity of the IR exposure means during the second recording process depending on an image statistic obtained by analyzing at least one RGB image, IR image, and/or HDR image already generated.

To do so, the camera system implements a corresponding method step.

The sensitivity of the IR exposure means is, for example, an ISO sensitivity. As image statistics, a histogram of the luminance or the evaluation of whether the lowest or highest bins are filled, i.e., whether individual pixels are underexposed or overexposed, can be generated. A corresponding image statistic can be generated for a respective entire individual image, i.e., for example the entire RGB image, or for one or more regions of interest of an image. Here, a weighting can also be carried out for the different regions of interest. This makes it possible to ensure that relevant image regions are particularly easy to recognize. Thus, by influencing the second exposure duration, the duration with which the infrared light source is operated and using the sensitivity of the IR exposure means, it is possible to influence how brightly the individual structures of the scene can be recognized in the IR image. The region of interest can then be defined, for example, as the image section of the IR image in which the eyes of the person driving a vehicle are located. The image capture can then be set in such a way that the eyes of the person driving the vehicle can then be recognized with sufficient quality in the corresponding IR images. Corresponding regions of interest can also be shifted adaptively, for example because a person driving the vehicle moves or adjusts their seat.

Taking into consideration the image statistics of the RGB image(s) or HDR image(s), the exposure of the corresponding IR image can be adjusted such that optimally usable RGB images are also generated where possible. However, the image metrics of the IR image are here preferred, since the use of the IR images is important for safety-relevant functions in the vehicle surroundings. For example, the second exposure duration can be increased so that underexposure of the corresponding second RGB image is prevented, since the second RGB image and the IR image are captured with the same exposure duration. However, the second exposure duration is here only increased to such an extent that there is no risk of overexposure of the IR image. In addition, the length of time the infrared light source is operated during the second recording process can here be reduced, for example, in order to additionally prevent the IR image from being exposed too much. This allows the second exposure duration to be increased even further. Here, the sensitivity of the IR exposure means can be reduced in the same way, such that the corresponding IR image additionally appears darker. This has an advantageous effect on the noise ratio of the IR image. The second exposure duration must also not be increased to such an extent that the eye safety of the persons being detected is endangered, surfaces illuminated by the infrared light source are heated too much and/or the lifespan of the infrared light source suffers too much.

A method according to the invention for operating a camera system described above provides that

- during at least one first recording process, the image sensor of the camera module is exposed with a first exposure duration, wherein a first RGB image is generated by means of the RGB exposure means;
- the infrared light source is activated in order to additionally illuminate the scene with infrared light during at least one second recording process, and during the second recording process the image sensor of the camera module is exposed with a second exposure duration differing from the first exposure duration, wherein a second RGB image is generated by means of the RGB exposure means and an IR image is generated by means of the IR exposure means; and
- the computing unit merges the at least one first RGB image and the at least one second RGB image to form an HDR image.

Further advantageous designs of the camera system according to the invention and the method for the operation thereof also emerge from the exemplary embodiments which are described below in more detail with reference to the Figures.

BRIEF DESCRIPTION OF THE DRAWING FIGURES

Figure 2:
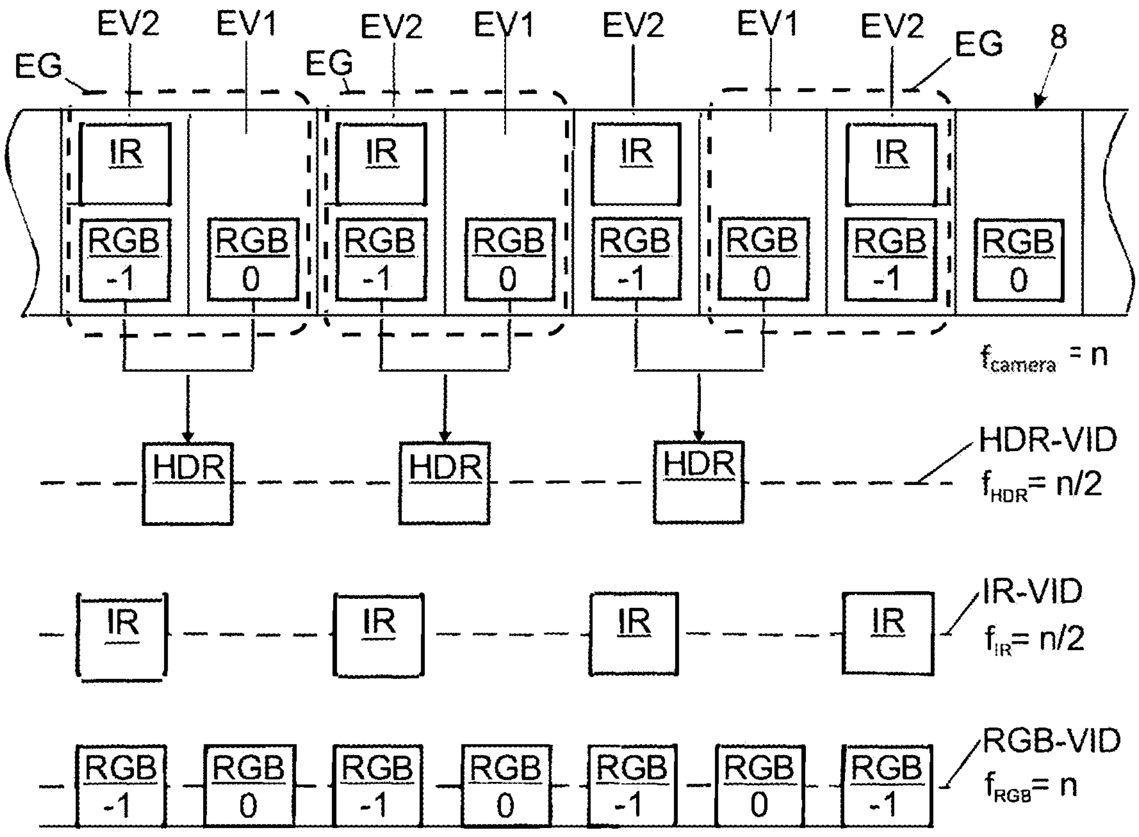
Figure 3:
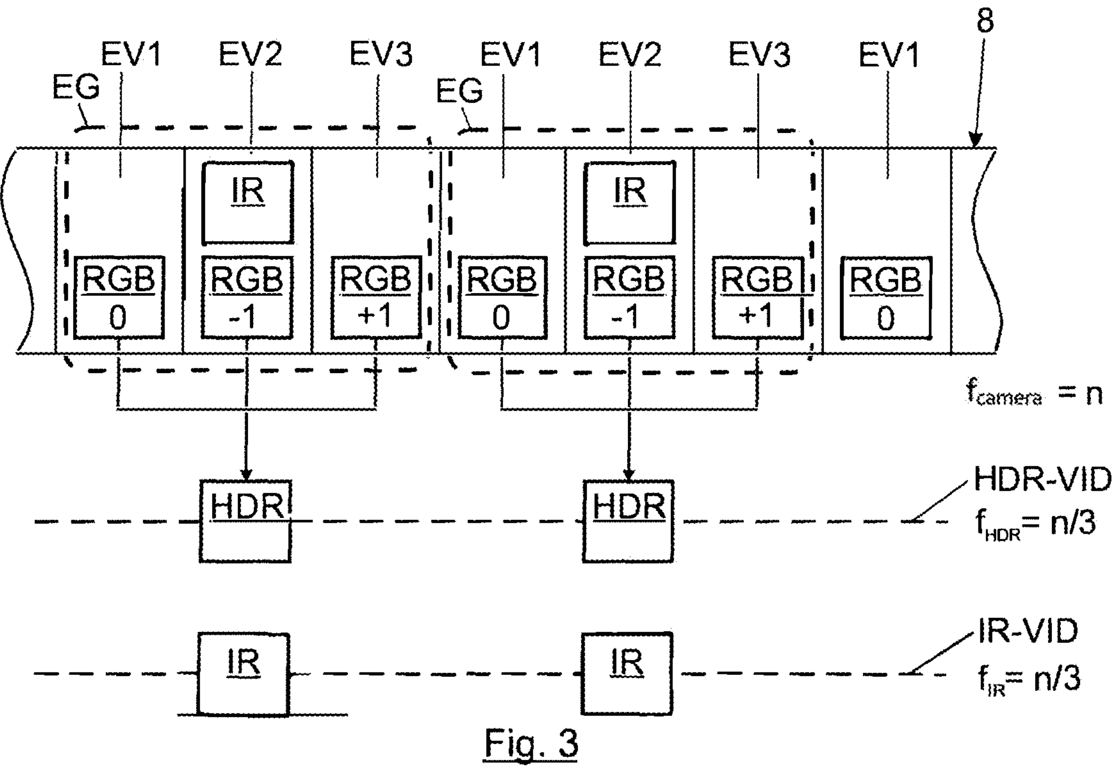
Figure 4:
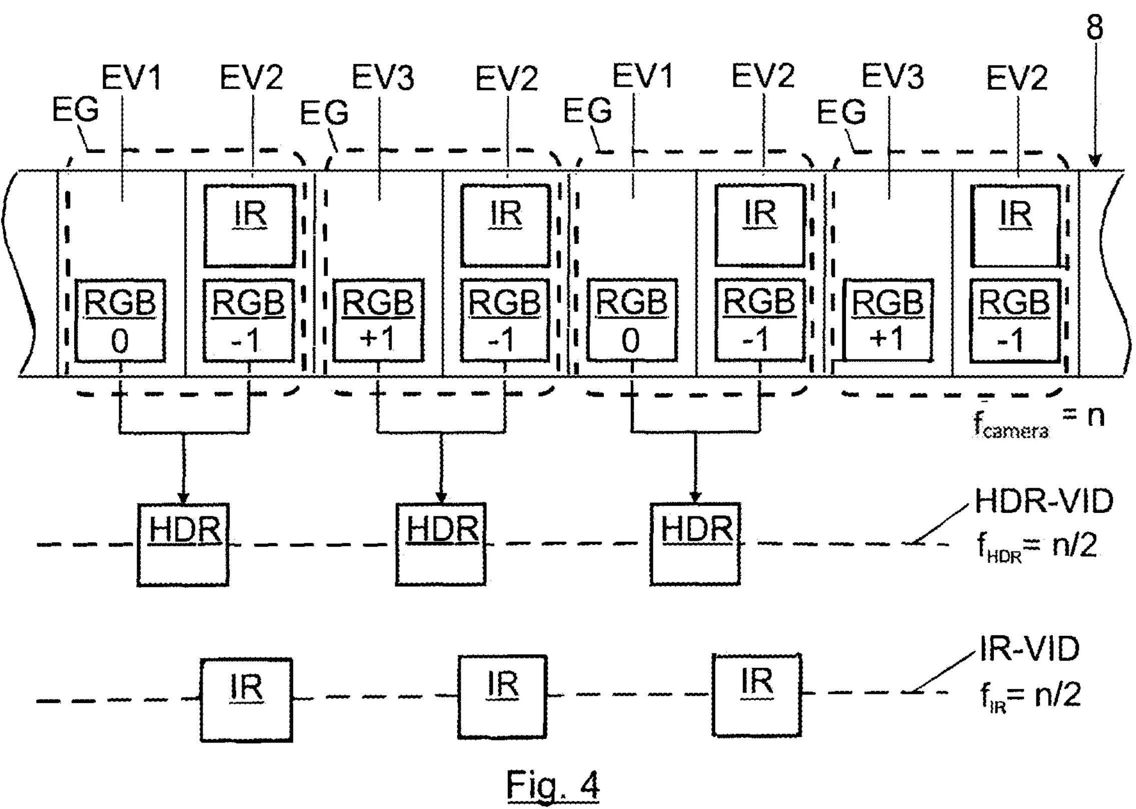
Figure 5:
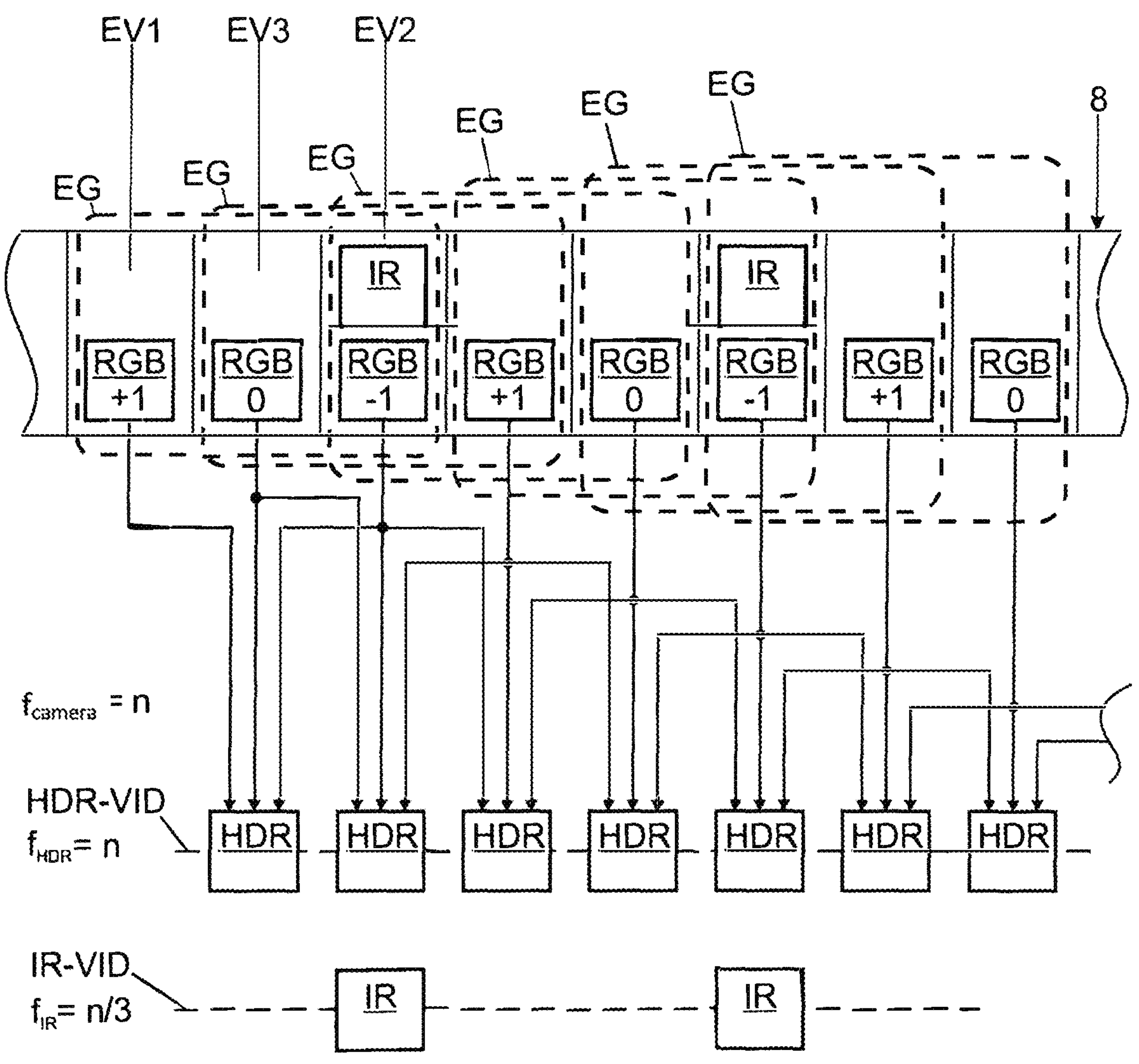
Figure 6:
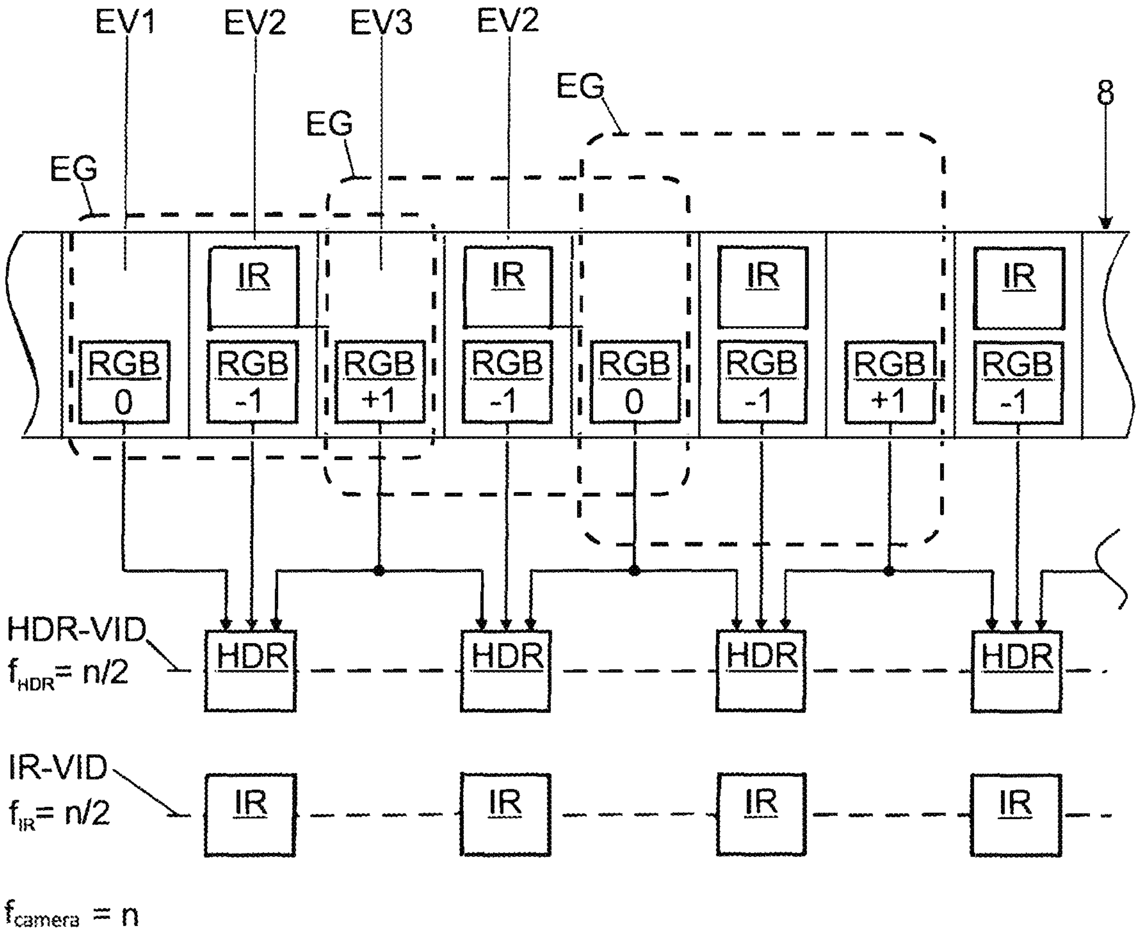
Figure 7:
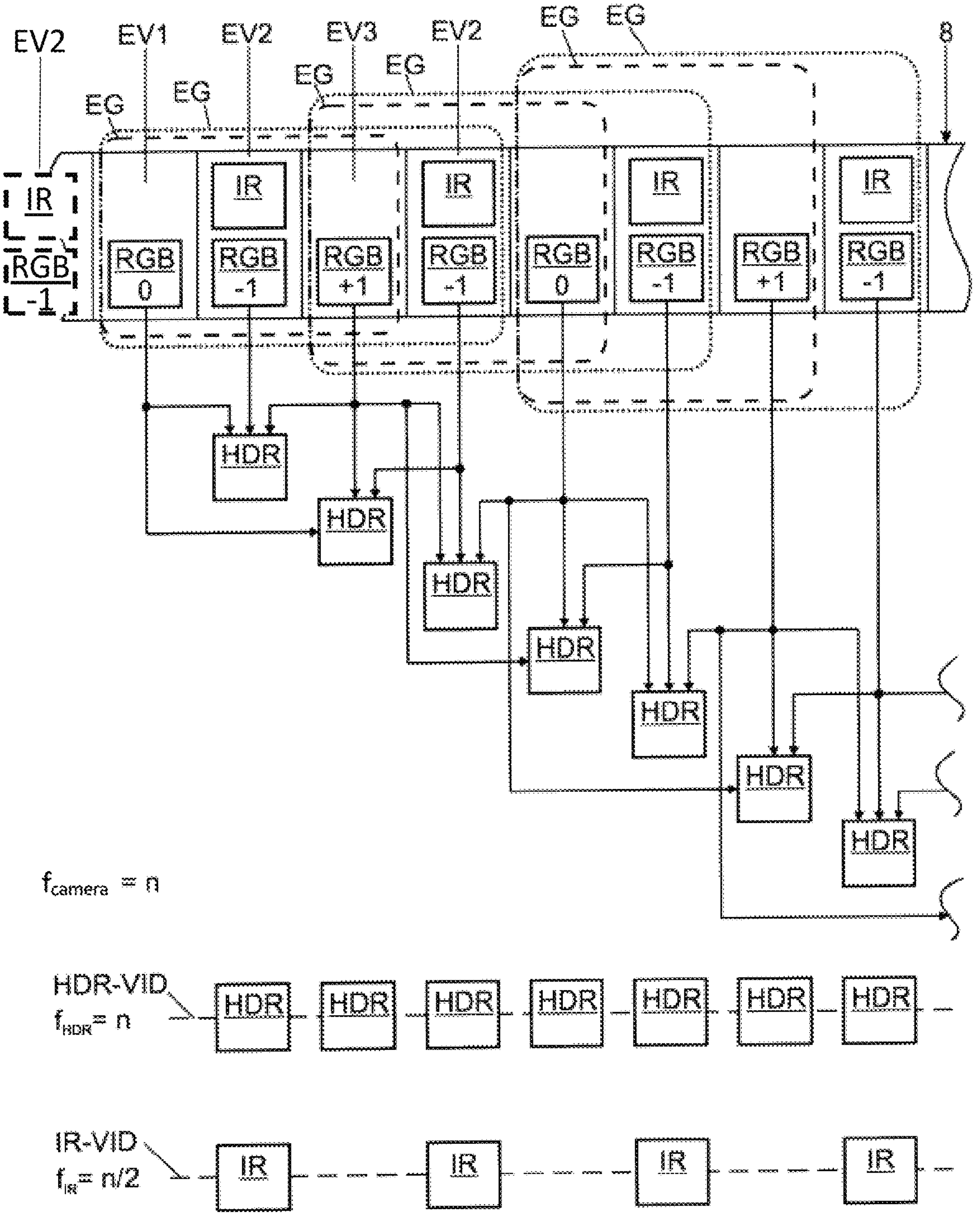

Here are shown:

FIG. 1 a schematic depiction of a camera system according to the invention;

FIG. 2 a sequence of the recording processes carried out by the camera system according to a first design;

FIG. 3 a sequence of the recording processes carried out by the camera system according to a second design;

FIG. 4 a sequence of the recording processes carried out by the camera system according to a third design;

FIG. 5 a sequence of the recording processes carried out by the camera system according to a fourth design;

FIG. 6 a sequence of the recording processes carried out by the camera system according to a fifth design; and FIG. 7 a sequence of the recording processes carried out by the camera system according to a sixth design.

DETAILED DESCRIPTION

FIG. 1 shows a camera system 1 according to the invention which is integrated into a vehicle 9. The camera system 1 comprises a camera module 2, a computing unit 4, and an infrared light source 7. The camera module 2 and the infrared light source 7 are arranged on the vehicle 9 and orientated towards it in such a way that an interior chamber of the vehicle 9 is captured as scene 3 by the camera module 2 or illuminated with infrared light by the infrared light source 7. This enables the vehicle occupants to be recorded. The computing unit 4 can be arranged as desired opposite the camera module 2 and the infrared light source 7, for example integrated into a common unit or also distributed, such that the computing unit 4 is formed by a computing unit of the vehicle 9, for example by a control unit of a vehicle subsystem.

The camera module 2 comprises an image sensor 5 with RGB exposure means 6.1 and IR exposure means 6.2. The respective exposure means 6.1 and 6.2 are arranged on the image sensor 5 in a two-dimensional matrix. When exposing the image sensor 5, it is possible to generate a color image with the RGB exposure means 6.1, which is also referred to as an RGB image RGB, see the following figures for this. Analogously, it is possible to detect infrared light by means of the IR exposure means 6.2 and thus to generate IR images IR.

The camera system 1 allows continuously captured individual images to be combined into a video stream, wherein the stringing together of RGB images, i.e., color images, allows the generation of a color video and the stringing together of IR images, i.e., images captured in the infrared spectrum, allows the generation of an infrared video. Color images or color videos can be used by a vehicle occupant as entertainment, for example to take selfies or to make a video call. The IR images or IR videos are processed by the vehicle 9, in particular to provide safety-relevant functionalities, for example in order to carry out a monitoring of the vital signs or the alertness of a person driving the vehicle. Due to the illumination by means of the infrared light source 7, camera images can also be captured with sufficient quality for evaluation in poor visibility conditions, for example at night.

The following figures show various exemplary embodiments of the sequence in which the camera system 1 performs which recording process EV1, EV2, EV3. Thus, the camera system 1 continuously capture a continuous stream of individual images, which represents a sequence 8 of the respective recording processes EV1, EV2, EV3.

FIG. 2 shows a first exemplary embodiment in which a first recording process EV1 and a second recording process EV2 are carried out alternately. The camera system 1 here has a scanning rate $f_{CAMERA}$ of n. For example, the scanning rate $f_{CAMERA}$ is 60 images per second, i.e., n=60 Hz. During the first recording process EV1, the camera system 1 generates a first RGB image RGB with a first exposure duration, which is symbolized by a 0. During a second recording process EV2, the camera system 1 simultaneously generates by means of the RGB exposure means 6.1 and the IR exposure means 6.2 an IR image IR and a second RGB image RGB with a second exposure duration, which is in particular shorter than the first exposure duration, indicated by the number −1. The IR image IR and the second RGB image RGB are both generated with the same exposure duration, namely said second exposure duration.

To generate an HDR image HDR, at least two RGB images with different exposure times are merged by the computing unit 4. To do so, two recording processes are combined to form a recording group EG, which is symbolized by dashed boxes in the figures.

Here, it does not matter whether the first detection process EV1 or the second detection process EV2 follows first in the sequence 8. Suitable boxes for the respective recording groups EG for both variants are marked in FIG. 2.

The correspondingly recorded or generated images can then be combined to form a video stream. Here, for the exemplary embodiment in FIG. 2, an image repetition rate $f_{IR}$ of an IR video stream IR-VID is half the scanning rate $f_{CAMERA}$ of the camera module 2, an image repetition rate $f_{HDR}$ of an HDR video stream HDR-VID is half the scanning rate $f_{CAMERA}$ of the camera module 2, and an image repetition rate $f_{RGB}$ of an RGB video stream RGB-VID is half the scanning rate $f_{CAMERA}$ of the camera module 2. Here, however, the RGB video stream RGB-VID will "flicker", since the consecutive images are alternately bright and dark due to the different exposure durations. A visual output of the RGB video stream RGB-VID is thus not a preferred embodiment, but is generally possible.

FIG. 3 shows an alternative design in which a third recording process EV3 is additionally carried out. Here, the image sensor 5 is exposed with a third exposure duration, and a third RGB image RGB is captured by means of the RGB exposure means 6.1. The third exposure duration can be longer or shorter than one of the other two exposure durations, for example longer than the first exposure duration, indicated by the number +1. The numbers +1, 0 and −1 here represent the exposure durations of the associated recording processes, for example +1 is longer than 0 and −1 is shorter, preferably a much shorter exposure time suitable for infrared capturing. In FIG. 5, on the other hand, the third exposure duration of the recording process EV3 is shorter than the first exposure duration of the recording process EV1, accordingly the two numbers 0 and +1 are correspondingly reversed, i.e., EV1 in FIG. 5 has the number 0 compared to the number 1 in FIG. 3 and EV3 in FIG. 5 has the number +1 compared to the number −1 in FIG. 3. By providing a third recording process, the dynamic scope of the HDR images HDR can be increased at the expense of the respective image repetition rates.

In the exemplary embodiment shown in FIG. 3, each recording group EG here comprises exactly one first recording process EV1, exactly one second recording process EV2, and exactly one third recording process EV3.

FIG. 4 shows a further alternative design in which, after each recording process in which an RGB image RGB with an exposure of 0 and +1 is generated alternately, a second recording process EV2 with an exposure time −1, i.e., the exposure time for the infrared image, is interposed. This allows an increase in the respective image repetition rate $f_{IR}$, $f_{HDR}$ of the respective video streams IR-VID, HDR-VID.

Here, two RGB images RGB with different exposure duration combinations are used to generate the directly consecutive HDR images HDR, i.e., 0 and −1 once, and +1 and −1 once. In general, it would also be possible to use all three exposure durations to generate the HDR images HDR, i.e., −1, 0 and +1, and to here reduce the image repetition rate of the HDR video stream HDR-Vid to n/3. This variant is not shown in any of the figures.

FIG. 5 shows another alternative design in which the individual images generated by the camera system 1 are at least temporarily stored in a ring buffer. Here, older individual images are overwritten by more recent individual images with each recording cycle. For a better overview, the successive recording groups EG in the ring buffer for generating the HDR images HDR are here shown increasingly larger in FIGS. 5 to 7, i.e., the smallest recording group EG shown, e.g., at time $t_0$, is followed by the next largest, e.g., at time $t_1$, which in turn is followed by the next largest, e.g., at time $t_3$ and so on. The data for individual images to the left of one of the recording groups in each case can correspondingly be removed from the ring buffer, and the free memory places in the ring buffer are filled with new data on the opposite side. As already mentioned, the exposure duration of the third recording process EV3 is shorter here in FIG. 5 than the exposure duration of the first recording process EV1.

To generate the HDR images HDR, the most recent RGB images RGB of the ring buffer are then always used, which can preferably presently only have three memory places. As depicted in FIG. 5, this corresponds to a sliding recording group EG. Thus, it is no longer necessary to completely capture a respective recording group EG in order to generate an HDR image HDR. Instead, it is sufficient to carry out only one further recording process EV1, EV2, or EV3 in order to be able to form a new recording group and generate an HDR image HDR. With a ring buffer with three memory places, for example, a first HDR image HDR is generated from the recording processes EV1, EV3 and EV2 shown on the outer left-hand edge. After a memory update, the EV1 arranged on the left-hand edge of the memory is removed, a new EV1 is saved on the right-hand side and the HDR image HDR is formed from the recording processes EV3, EV2, and the new EV1. In the next update, EV2 is omitted on the left, and a new EV3 is stored on the right; the HDR image HDR is then formed from EV2, EV1, and the new EV3. The ring buffer is continuously updated, the next step again corresponds to the first step mentioned above. Here, FIG. 5 shows the case comparable to FIG. 3, where each different recording process EV1, EV2, EV3 is carried out exactly once before it is carried out again. The HDR image is respectively generated from the recording processes EV1, EV2, EV3, i.e., with the exposure times +1, 0 and −1 in alternating order. Compared to the exemplary embodiment in FIG. 3, in doing so, the image repetition rate $f_{HDR}$ of the HDR video stream HDR-VID can be increased to the scanning rate $f_{CAMERA}$=n of the camera module 2, the repetition rate of the infrared images is fir=n/3.

FIG. 6 shows a further alternative design, which is comparable to the exemplary embodiment shown in FIG. 4. Here, a second recording process EV2, i.e., the simultaneous recording of an RGB image RGB and an IR image IR with simultaneous illumination of the scene 3 by means of the infrared light source 7, is carried out each time after or before such a recording process is carried out in which only an RGB image RGB is captured alternately with an exposure time +1 or 0. The recording group EG for generating the HDR image is here not determined every cycle as in FIG. 5, but every second cycle. The ring buffer is rewritten with each cycle; here, too, the ring buffer preferably has three memory places, the principal mode of operation of the ring buffer corresponds to that of FIG. 5. This allows the image repetition rate $f_{IR}$ of the IR video stream IR-VID to be increased from one third to n/2, wherein the image repetition rate $f_{HDR}$ of the HDR video stream HDR-VID is, however, reduced from n to n/2.

Also, as shown in FIG. 4, two different exposure durations could always be merged into one HDR image HDR, i.e. 0 and −1 once and +1 and −1 once. In doing so, however, the dynamic range would be unnecessarily reduced.

FIG. 7 shows a further possible embodiment in which the image repetition rate of the HDR video stream HDR-Vid can be increased to the value of the image recording rate of the camera module. The sequence of the cyclically rolling recording processes stored in the ring buffer is here a second recording process EV2 (exposure duration −1) followed by a third recording process EV3 (exposure duration +1), and then again a second recording process followed by a first recording process EV1 (exposure duration 0). Here, the HDR image HDR is merged with each recording cycle from images saved in the ring buffer and captured in each case with three exposure durations −1, 0, and +1. The recording group EG thus extends alternately with each cycle over the last three or four saved recording processes EV, which enables merging with said three exposure durations. The ring buffer thus preferably has four memory places. In FIG. 7, in a first state, the recording process EV2 shown with a dashed line and depicted on the left would be stored consecutively followed by EV1, EV2, and EV3 in the four memory places, wherein the HDR image HDR is formed from the recording group shown with a dashed line with the recording processes EV3, EV2, and EV1. After an update and storage of new data, a new recording process EV2 is added to the ring buffer on the right, and the dashed EV2 on the left is omitted, such that EV1, EV2, EV3 and EV2 are now stored in the ring buffer one after the other when seen from the left. The HDR image HDR is created in the dotted recording group EG from the most recent EV2, EV3 and EV1. After saving new data, a new recording process EV1 is added to the ring buffer on the right, and the older EV1 on the left is omitted; the sequence of the recording processes when seen from the left is then EV2, EV3, EV2, and EV1. The HDR image HDR is generated in the dashed-dotted recording group EG from the successive recording processes EV3, EV2, and EV1 when seen from the left. In the next cycle, a new EV2 is saved in the ring buffer, and the older one is deleted. The ring buffer again comprises EV3, EV2, EV1, and EV2 one after the other from the left. The HDR image HDR is generated in the dotted recording group EG from the most recent EV2, the EV1, and EV3.

With the next storage process, an EV3 is stored, and the older EV3 is removed from the buffer, such that the buffer again has the first state mentioned above, namely, seen from the left, the recording processes successively EV2, EV1, EV2, and EV3, wherein the HDR image HDR is generated in the dashed recording group from EV3, EV2 and EV1. Starting from the first state, the storage processes following the first state one after the other are repeated and the HDR images HDR are generated as described above.

Here, an IR image is captured with each recording process EV2.

By means of the camera system 1 according to the invention and the corresponding method for the operation thereof, it is possible to simultaneously generate IR video streams IR-VID and HDR video streams HDR-VID with a sufficient image repetition rate and a comparatively high dynamic range based on currently available image sensors 5 or camera modules 2. Thanks to the active illumination when capturing the infrared images, sufficiently recognizable individual images can be recorded, in particular in poor lighting conditions. By using the ring buffer, the image repetition rate of the HDR video stream HDR-VID can be further increased while maintaining the same dynamic scope. The image repetition rate $f_{HDR}$ of the HDR video stream HDR-VID corresponds to $f_{CAMERA}$=n of camera module 2, the repetition rate of the infrared images is fir=n/2.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A camera system comprising:

a camera module configured to generate camera images of a scene; and a computing unit configured to control the camera module and to process the camera images, wherein the camera module has an image sensor configured to record light in a visible spectrum using RGB pixels and light in an infrared spectrum using IR pixels, wherein the camera module is configured to capture at least two individual images of the scene by an exposure of the image sensor during at least two recording processes with different exposure durations, wherein the computing unit is configured to control the camera module to expose the image sensor with light in the visible spectrum with a first exposure duration during at least one first recording process, wherein a first RGB image is generated by the RGB pixels, and control an infrared light source to illuminate the scene with infrared light in addition to the light in the visible spectrum during at least one second recording process and simultaneously control the camera module to expose the image sensor during the second recording process with a second exposure duration deviating from the first exposure duration, wherein, during the second recording process, the image sensor simultaneously generates a second RGB image using the RGB pixels and an IR image using the IR pixels, and wherein the computing unit is configured to merge the first RGB image and the second RGB image to form an HDR image.

2. The camera system of claim 1, wherein the camera module and the computing unit are configured to continuously record the scene with a sequence from a plurality of first and second recording processes, wherein at least several first RGB images and second RGB images captured temporally one after the other are joined to form an RGB video stream, several IR images captured temporally one after the other are joined to form an IR video stream, or several HDR images generated temporally one after the other are joined to form an HDR video stream.

3. The camera system of claim 2, wherein the computing unit is further configured to:

control the camera module to expose the image sensor with a third exposure duration, which deviates from the first and second durations, during at least one third recording process, wherein a third RGB image is generated by the RGB pixels;

set a sequence of the recording processes to the first recording process, the second recording process, and the third recording process; and merge the first RGB image, the second RGB image, and the third RGB image to form an HDR image.

4. The camera system of claim 2, wherein the computing unit is further configured to:

control the camera module to expose the image sensor with a third exposure duration, which deviates from the first and second durations, during at least one third recording process, wherein a third RGB image is generated by the RGB pixels;

set a sequence of the recording processes to the second recording process, the first recording process, the second recording process, and third recording process; and merge the first RGB image with the second RGB image to form an HDR image; and merge the third RGB image with at least one second RGB image to form an HDR image, or merge the first RGB image, the second RGB image, and the third RGB image to form an HDR image.

5. The camera system of claim 3, wherein the computing unit comprises a ring buffer, which is configured to sequentially store individual images generated temporally one after the other, such that by adding a respective most recent individual image to the ring buffer, a respective oldest individual image is deleted from the ring buffer, wherein the ring buffer has at least such a buffer capacity that at least one first RGB image, a second RGB image, and an IR image can be permanently held in the ring buffer, and wherein the computing unit is further configured to merge at least the respectively most recent first RGB image and second RGB image to form the HDR image in order to generate the HDR image.

6. The camera system of claim 5, wherein the computing unit is further configured to set a sequence of the recording processes to:

the first recording process;

the third recording process; and the second recording process to merge the respectively most recent first RGB image, second RGB image, and third RGB image to form the HDR image.

7. The camera system of claim 5, wherein the computing unit is further configured to set a sequence of the recording processes to:

the second recording process;

the first recording process;

the second recording process; and the third recording process, to merge the respectively most recent first RGB image, second RGB image, and third RGB image to form the HDR image.

8. The camera system of claim 1, wherein the computing unit is configured to determine a movement speed of an object present in at least two successive individual images, to compare the movement speed to a predetermined threshold value, and to exclude the RGB images generated for the corresponding recording processes from merging to form an HDR image when the movement speed is greater than the predetermined threshold value.

9. The camera system of claim 1, wherein the computing unit is configured to recognize at least one edge of an object present in at least two successive individual images or a surface structure of the object, compare the edge or the surface structure in the respective individual images with one another to recognize a difference and to exclude the RGB images generated for corresponding recording processes from merging to form an HDR image when the recognized difference is greater than a predetermined threshold value.

10. The camera system of claim 9, wherein the computing unit is configured to implement a machine learning model into which the at least two individual images are input variables when the difference is greater than the predetermined threshold value, whereupon the machine learning model generates a correction image from the at least two individual images, in which correction image the edge or surface structure is highlighted or positioned differently to reduce the difference below the threshold value.

11. The camera system of claim 9, wherein the at least two successive individual images comprise at least one RGB image and at least one IR image.

12. The camera system of claim 1, wherein the computing unit is configured to control the camera module and the infrared light source to change, depending on an image statistic obtained by analyzing at least one RGB image, IR image, or HDR image already generated:

the second exposure duration, a time duration with which the infrared light source is operated, or a sensitivity of the IR pixels during the second recording process.

13. A method for operating a camera system comprising a camera module configured to generate camera images of a scene and a computing unit configured to control the camera module and to process the camera images, the method comprising:

exposing, during at least one first recording process, an image sensor of the camera module with a first exposure duration with light in a visible range, wherein a first RGB image is generated by RGB pixels of the camera module;

activating an infrared light source to illuminate the scene with infrared light in addition to light in a visible spectrum during at least one second recording process, and during the second recording process the image sensor of the camera module is exposed with a second exposure duration differing from the first exposure duration, wherein during the second recording process, a second RGB image is generated by the RGB pixels simultaneously with an IR image generated by IR pixels of the camera module; and merging, by the computing unit, the RGB image and the RGB image to form an HDR image.

14. The method of claim 13, wherein the camera module and the computing unit are configured to continuously record the scene with a sequence from a plurality of first and second recording processes, wherein at least several first RGB images and second RGB images captured temporally one after the other are joined to form an RGB video stream, several IR images captured temporally one after the other are joined to form an IR video stream, or several HDR images generated temporally one after the other are joined to form an HDR video stream.

15. The method of claim 14, further comprising:

controlling the camera module to expose the image sensor with a third exposure duration, which deviates from the first and second durations, during at least one third recording process, wherein a third RGB image is generated by the RGB pixels;

setting a sequence of the recording processes to the first recording process, the second recording process, and the third recording process; and merge the first RGB image, the second RGB image, and the third RGB image to form an HDR image.

16. The method of claim 14, further comprising:

controlling the camera module to expose the image sensor with a third exposure duration, which deviates from the first and second durations, during at least one third recording process, wherein a third RGB image is generated by the RGB pixels;

setting a sequence of the recording processes to the second recording process, the first recording process, the second recording process, and third recording process; and merging the first RGB image with at least one second RGB image to form an HDR image; and merging the third RGB image with at least one second RGB image to form an HDR image, or merge the first RGB image, the second RGB image, and the third RGB image to form an HDR image.

17. The method of claim 15, wherein the computing unit comprises a ring buffer that sequentially stores individual images generated temporally one after the other, such that by adding a respective most recent individual image to the ring buffer, a respective oldest individual image is deleted from the ring buffer, wherein the ring buffer has at least such a buffer capacity that at least one first RGB image, a second RGB image, and an IR image can be permanently held in the ring buffer, and wherein the computing unit is further configured to merge at least the respectively most recent first RGB image and second RGB image to form the HDR image in order to generate the HDR image.

18. The method of claim 17, wherein the computing unit sets a sequence of the recording processes to:

the first recording process, the third recording process, and the second recording process to merge the respectively most recent first RGB image, second RGB image, and third RGB image to form the HDR image or the second recording process, the first recording process, the second recording process, and the third recording process to merge the respectively most recent first RGB image, second RGB image, and third RGB image to form the HDR image.

19. The method of claim 13, wherein the computing unit determines a movement speed of an object present in at least two successive individual images, to compare the movement speed to a predetermined threshold value, and to exclude the RGB images generated for the corresponding recording processes from merging to form an HDR image when the movement speed is greater than the predetermined threshold value.

20. The method of claim 13, further comprising:

recognizing at least one edge of an object present in at least two successive individual images or a surface structure of the object; and comparing the edge or the surface structure in the respective individual images with one another to recognize a difference and to exclude the RGB images generated for corresponding recording processes from merging to form an HDR image when the recognized difference is greater than a predetermined threshold value.

* * * * *